United States Patent
Shin et al.

(10) Patent No.: US 8,161,507 B2
(45) Date of Patent: Apr. 17, 2012

(54) CHANNEL SWITCHING IN A DIGITAL BROADCASTING SYSTEM

(75) Inventors: Jae-Jin Shin, Seoul (KR); Sung-Kwon Park, Seoul (KR); Hong-Ik Kim, Yongin-si (KR); Tae-Woong Kim, Goyang-si (KR); Su-Kyung Kim, Ansan-si (KR); Joon-Soon Im, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 871 days.

(21) Appl. No.: 11/442,122

(22) Filed: May 30, 2006

(65) Prior Publication Data
US 2007/0016920 A1    Jan. 18, 2007

(30) Foreign Application Priority Data
Jul. 12, 2005   (KR) .......................... 10-2005-0062871

(51) Int. Cl.
*H04N 7/16* (2011.01)

(52) U.S. Cl. ................. 725/27; 725/25; 725/31; 725/86

(58) Field of Classification Search .................... 725/25, 725/31, 27
See application file for complete search history.

(56) References Cited

U.S. PATENT DOCUMENTS

| | | | | |
|---|---|---|---|---|
| 5,600,378 | A * | 2/1997 | Wasilewski | 348/468 |
| 6,983,478 | B1 * | 1/2006 | Grauch et al. | 725/13 |
| 7,296,284 | B1 * | 11/2007 | Price et al. | 725/39 |
| 7,515,712 | B2 * | 4/2009 | Wasilewski et al. | 380/239 |
| 2005/0120197 | A1 * | 6/2005 | Bons et al. | 713/150 |
| 2009/0153747 | A1 | 6/2009 | Grimes | |

FOREIGN PATENT DOCUMENTS

| | | |
|---|---|---|
| JP | 11224462 | 8/1999 |
| JP | 11317715 | 11/1999 |
| JP | 2002185901 | 6/2002 |
| JP | 2007-502575 | 2/2007 |
| KR | 2000-0045149 | 7/2000 |
| WO | 98/31114 | 7/1998 |
| WO | WO 03065650 A2 * | 8/2003 |

OTHER PUBLICATIONS

Korean Decision of Grant corresponding to Korean Patent Application No. 2005-62871, issued on Aug. 22, 2007.
Office action from the State intellectual Property Office of People's Republic of China issued in Applicant's corresponding Chinese Patent Application No. 200610101950.9 dated Jun. 12, 2009.

* cited by examiner

*Primary Examiner* — Scott Beliveau
*Assistant Examiner* — Kunal Langhnoja
(74) *Attorney, Agent, or Firm* — H.C. Park & Associates, PLC

(57) ABSTRACT

A channel-switching apparatus and method in a digital broadcasting system omits conditional access control in logical channel-switching in one physical channel from processes that are executed for channel-switching in a digital broadcasting system, thereby reducing channel-switching time.

12 Claims, 5 Drawing Sheets

CHANNEL SWITCHING IN A DIGITAL BROADCASTING SYSTEM

CLAIM OF PRIORITY

This application makes reference to, incorporates the same herein, and claims all benefits accruing under 35 U.S.C. §119 from an application for APPARATUS AND METHOD OF CHANNEL CHANGING ON DIGITAL BROADCAST SYSTEM earlier filed in the Korean Intellectual Property Office on 12 Jul. 2005 and there duly assigned Serial No. 10-2005-0062871.

BACKGROUND OF THE INVENTION

1. Field of the Invention

The present invention relates to channel-switching in a digital broadcasting system. More particularly, the present invention relates to a channel-switching apparatus and method in a digital broadcasting system.

2. Description of the Related Art

A digital broadcasting system transmits contents data by compressing them according to channels in a high concentration based upon Moving Picture Experts Group (MPEG) coding standards and then multiplexing them corresponding to a number of channels based upon digital modulation according to transmitting media. Due to these characteristics, the digital broadcasting system can transmit tens or hundreds of channels unlike an analog broadcasting system. The digital broadcasting system can remarkably raise the efficiency of frequency availability over that of the analog broadcasting system. Through this, the digital broadcasting system can advantageously increase the number of broadcast channels. Besides, digital broadcasting system enables multiple utilization of softwares in specialized pay broadcasting and bidirectional service broadcasting, and thus achieve an opportunity that broadcasting industry can develop into multimedia industry. Owing to these reasons, the digital broadcasting system is being widened starting from satellite broadcasting up to cable and ground wave broadcasting, and highlighted as next generation broadcasting technologies.

However, the digital broadcasting system requires long channel-switching (zapping) time owing to digital broadcast signal processing, digital contents protection and bidirectional application. This is not a frequent phenomenon in analog broadcasting, and thus gives inconvenience to digital broadcasting audience. Such long channel-switching time may occur to any of digital cable, ground wave and satellite broadcasting.

Factors that create long channel-switching time in digital broadcasting may include tuning time especially for physical channels, conditional access confirmation for contents protection, decoding for logical channel discrimination and so on. So, digital broadcasting requires long channel-switching time since such several procedures have to be carried out for broadcast receipt. Such long channel-switching time may cause severe dissatisfaction to users.

SUMMARY OF THE INVENTION

The present invention, as will be described hereinafter, has technical features in that conditional access control in logical channel-switching in one physical channel can be omitted from processes that are executed for channel-switching in a digital broadcasting system, thereby reducing channel-switching time.

According to one aspect of the present invention for realizing the above objects, a channel-switching apparatus of a broadcast transmission system in a digital broadcasting system is provided, including: a controller adapted generate conditional access information on physical channels, and to output the generated conditional access information on its physical channel.

The controller constructs each of the physical channels to include logical channels of an equal broadcast policy.

The conditional access information on physical channels includes at least one piece of information selected from a group consisting of a Conditional Access Table (CAT), an Entitlement Control Message (ECM), an Entitlement Management Message (EMM) and a Control Word (CW).

Each physical channel includes a broadband channel.

According to another aspect of the present invention for realizing the above objects, a channel-switching apparatus of a broadcast transmission system in a digital broadcasting system is provided, including: a tuner adapted to tune physical channels to discriminate each physical channel; a conditional access unit adapted to execute conditional access control on the tuned physical channels; a demultiplexer adapted to demultiplex the conditional access-controlled physical channels to discriminate logical channels in the physical channels; and a controller adapted to control the tuner, the conditional access unit, the demultiplexer and a demodulator to receive a logical channel in response to a channel-switching request from a user to output that logical channel.

The conditional access unit is preferably adapted to receive conditional access information in physical channel units corresponding to received physical channels, and to execute conditional access control of the received physical channels based upon the received conditional access information.

The conditional access information preferably includes at least one piece of information selected from a group consisting of a Conditional Access Table (CAT), an Entitlement Control Message (ECM), an Entitlement Management Message (EMM) and a Control Word (CW) on physical channels.

The controller is preferably adapted to select logical channels preferred by the user based upon past channel-switching history of the user, and to request the broadcast transmission system to provide physical channels including the selected preference logical channels. The controller is preferably adapted to receive interested logical channels and to request the broadcast transmission system to provide physical channels including the interest logical channels.

According to still another aspect of the present invention for realizing the above objects, a channel-switching system in a digital broadcasting system, comprising: a broadcast transmission system adapted to generate conditional access information on physical channels and to transmit the conditional access information as included in its physical channel; and a broadcast receiving system adapted to, upon receiving a channel-switching request from a user, receive any of the physical channels including a logical channel corresponding to the request to execute conditional access control, to receive the conditional access-controlled physical channel in response to the user request to execute conditional access control of physical channels, and to output a logical channel corresponding to the user request from the conditional access-controlled physical channel.

The broadcast transmission system is preferably adapted to transmit logical channels of an equal conditional access policy as included in one physical channel.

The conditional access information preferably includes at least one piece of information selected from a group consisting of a Conditional Access Table (CAT), an Entitlement Control Message (ECM), an Entitlement Management Message (EMM) and a Control Word (CW) on physical channels.

The controller is preferably adapted to select logical channels preferred by the user based upon past channel-switching history of the user, and to request the broadcast transmission system to provide physical channels including the selected preference logical channels. The controller is preferably adapted to receive interested logical channels and to request the broadcast transmission system to provide physical channels including the interest logical channels.

According to yet another aspect of the present invention for realizing the above objects, a channel-switching method of a broadcast transmission system in a digital broadcasting system is provided, the method including: generating conditional access information on physical channels; and outputting the generated conditional access information as included in its physical channel.

Each of the physical channels preferably includes logical channels of an equal broadcast policy.

The conditional access information preferably includes at least one piece of information selected from a group consisting of a Conditional Access Table (CAT), an Entitlement Control Message (ECM), an Entitlement Management Message (EMM) and a Control Word (CW) on physical channels.

According to a final aspect of the present invention for realizing the above objects, a channel-switching method of a broadcast receiving system in a digital broadcasting system is provided, the method including: receiving a channel-switching request from a user; tuning a physical channel including a logical channel corresponding to the user request; executing conditional access control of the physical channel with reference to conditional access information included in the tuned physical channel; and outputting the logical channel corresponding to the user request from the conditional access-controlled physical channel.

The physical channel preferably includes logical channels of an equal broadcast policy.

The conditional access information preferably includes at least one piece of information selected from a group consisting of a Conditional Access Table (CAT), an Entitlement Control Message (ECM), an Entitlement Management Message (EMM) and a Control Word (CW) on physical channels.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

The following description will present a channel-switching apparatus and method in a digital broadcasting system according to exemplary embodiments of the present invention. The system to which the present invention is applied will be assumed hereinafter to be a digital cable broadcasting system. However, this assumption is merely an example to facilitate the understanding of the present invention. However, the present invention is not limited thereto.

Before describing the channel-switching apparatus and method in accordance with an embodiment of the present invention, an explanation follows with respect to channels in a digital broadcasting system. Those channels used for the transmission of contents in the digital broadcasting system can be generally classified into physical and logical channels. A physical channel is constituted to include at least one logical channel, in which contents are generally transmitted via one logical channel. Of course, the concept of the present invention can be equally reflected when a single logical channel transmits a plurality of contents.

A digital broadcasting system user requests channel-switching when he/she wants to watch contents different from those being currently provided. Channel-switching can be regarded in two situations, that is, switching between logical channels present in different physical channels and switching between those present in a single physical channel. This invention aims to execute conditional access on channel in physical channel units rather than logical channel units in order to reduce channel-switching time. Of the two types of channel-switching, the present invention can be efficiently used especially in switching between logical channels present in a single physical channel since switching between physical channels needs conditional access control even in the application of the present invention.

A channel-switching apparatus in a digital broadcasting system in accordance with an embodiment of the present invention can be regarded as applicable to both a broadcast transmission system and a broadcast receiving system in a digital broadcasting system. For the realization of this invention, the broadcast transmission system must generate and provide conditional access information that enables conditional access in physical channel units together with physical channels, and the broadcast receiving system must control conditional access in physical channel units with reference to conditional access information from the broadcast transmission system.

Hereinafter the channel-switching apparatus of the digital broadcasting system is described with respect to both the broadcast transmission system and the broadcast receiving system.

First, a description follows on a channel-switching apparatus in the broadcast transmission system. The digital broadcast transmission system will be assumed to be a head-end hereunder.

Figure 1:
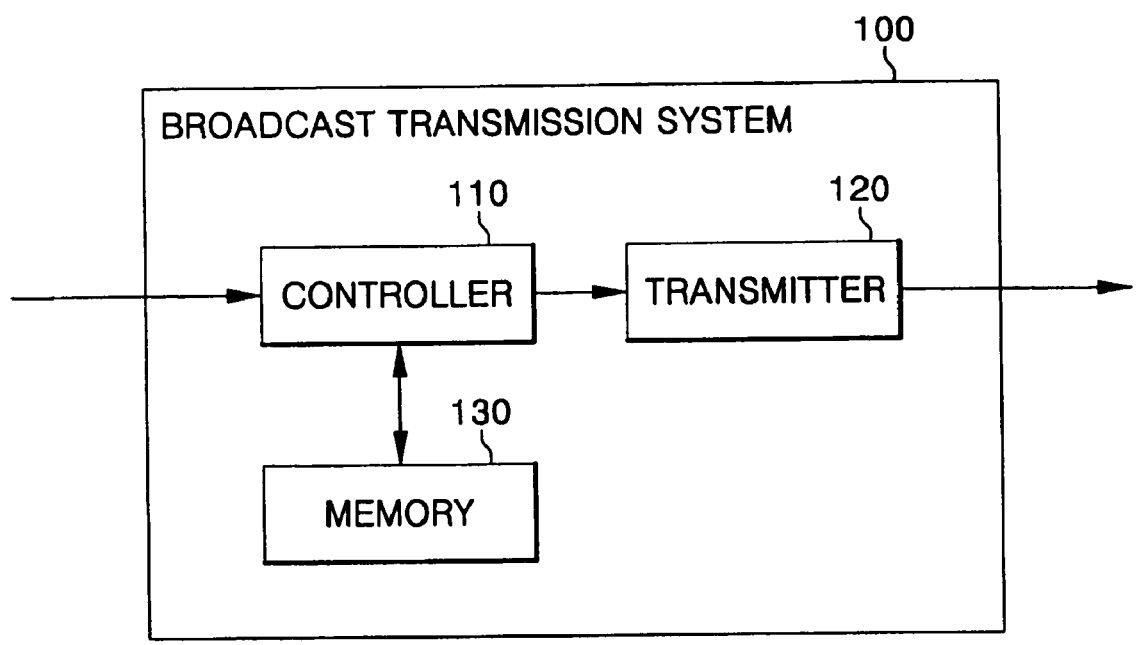
FIG. 1 is a block diagram of a digital broadcast transmission system including channel-switching in accordance with an embodiment of the present invention.

FIG. 1 is a block diagram of a digital broadcast transmission system including channel-switching in accordance with an embodiment of the present invention.

As shown in FIG. 1, a digital broadcast transmission system 100 includes a controller 110, a transmitter 120 and a memory 130.

The controller 100 of the digital broadcast transmission system 100 generates conditional access information that enables the channel-switching in accordance with an embodiment of the present invention. The transmitter 120 transmits conditional access information received from the controller 110 and contents scrambled in physical channel units to the broadcast receiving system. The transmitter 120 converts transmitting data into a format defined according to the properties of transmission media used in transmission. Examples of the transmission media include wireless linked and transmission lines. The memory 130 stores conditional access information.

Conditional access information generated by the controller 110 is information that enables channel-switching as well as conditional access control on a physical channel basis. Such conditional access information includes several items, such as Conditional Access Tables (CATs), Entitlement Control Messages (ECMs), Entitlement Management Messages (EMMs) and Control Words (CWs) on a physical channel basis. Conditional access information is then provided to the broadcast receiving system.

In other words, the digital broadcast transmission system 100 provides the digital broadcast receiving system with broadcast data that is conditional access-controlled or scrambled on a physical channel basis. The broadcast data scrambled on a physical channel basis is provided together with corresponding conditional access information.

Since conditional access control is carried out on a physical channel basis, physical channels transmitting contents of the same broadcast policy are preferably included in the same physical channel. Herein broadcast policy includes, for example, decisions of digital broadcasters related to pay-channel levels, service levels and broadcast channels such as adult-oriented channels requiring a fee or conditional playing. Of course, various other broadcast policies can be adopted.

As described above, the channel-switching in accordance with an embodiment of the present invention is effectively used in particular for switching between logical channels present in a single physical channel. Thus, the present invention can be more effective if one physical channel includes a large number of logical channels. A large number of logical channels existing in one physical channel will raise the probability of request for logical channel-switching in one physical channel. Since a time period consumed in logical channel-switching in one physical channel is much shorter than that in physical channel-switching, the average time period consumed in channel-switching decreases as the probability of a request for logical channel-switching in one physical channel rises.

The broadcast transmission system 100 in accordance with an embodiment of the present invention processes broadband convergence on a physical channel basis in order to include a larger number of logical channels in one physical channel. Broadband physical channels can have a larger capacity, and thus include a larger number of logical channels.

Also, in order to raise the probability of a request for logical channel-switching in one physical channel, the broadcast transmission system 100 in accordance with an embodiment of the present invention can generate a physical channel including logical channels that the broadcast receiving system requests. If idle physical channels exist, when the broadcast receiving system requests selector channels, the broadcast transmission system 100 can transmit requested logical channels in one physical channel. This is possible since the digital broadcasting system has a number of channels to provide. However, since the number of channels that the digital broadcasting system can provide is limited, it will be preferable to provide selector channels selectively to premium users. The selector channels that the broadcast receiving system requests from the digital broadcast transmission system 100 can include "preference channel" that users mainly watch, "interested channel" that users have set and so on.

A description follows of a channel-switching apparatus in a broadcast receiving system in accordance with an embodiment of the present invention. The broadcast receiving system will be assumed hereunder to be a Set-Top Box (STB).

The channel-switching apparatus in the broadcast receiving system in accordance with an embodiment of the present invention has a construction with a conditional access system being located between a tuner and a demultiplexer. The broadcast receiving system in accordance with an embodiment of the present invention receives a physical channel from the broadcast transmission system, in which the physical channel is set to enable conditional access control on a physical channel basis, and with the received physical channel, processes channel-switching requested by a user.

Figure 2:
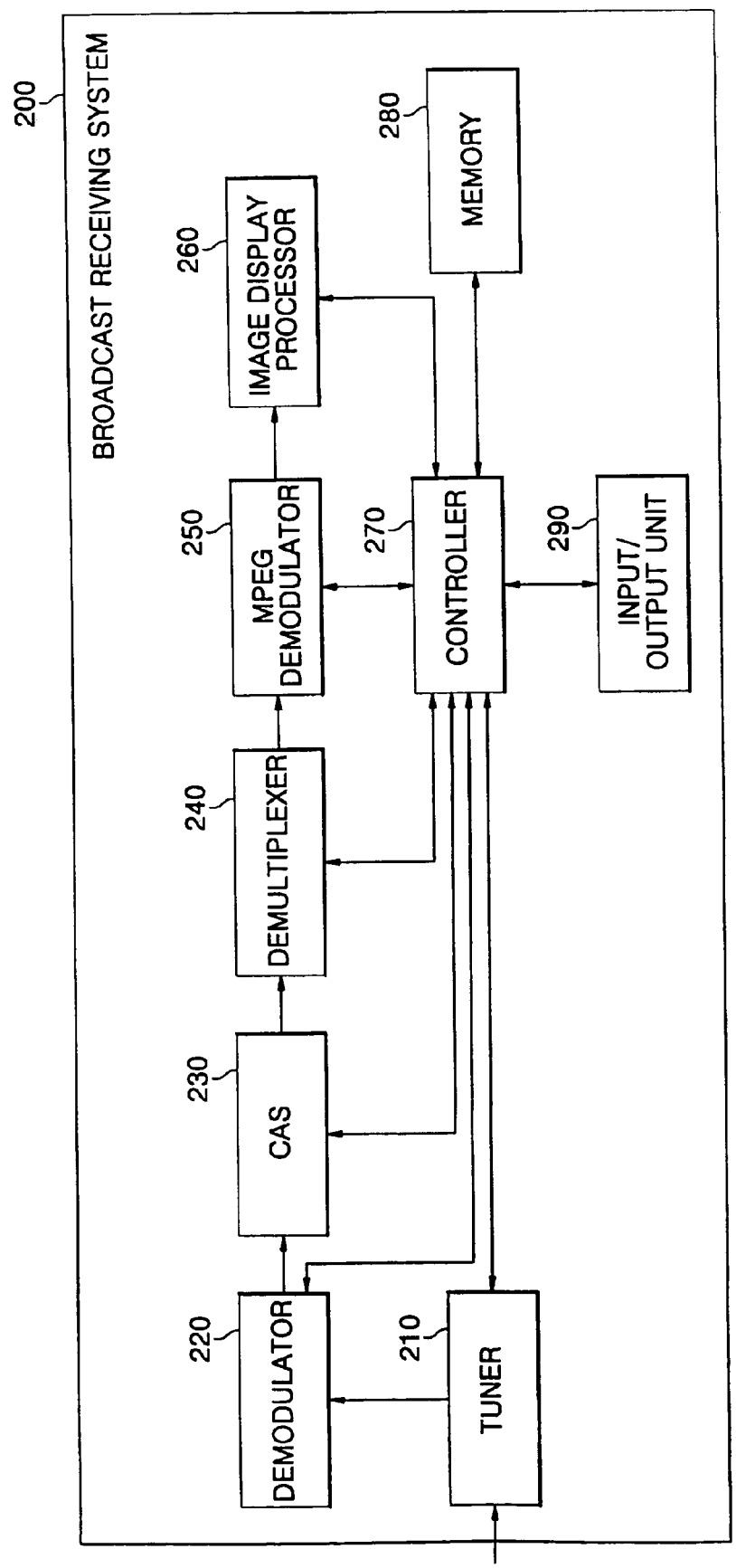
FIG. 2 is a block diagram of a digital broadcast receiving system including channel-switching in accordance with an embodiment of the present invention.

FIG. 2 is a block diagram of a digital broadcast receiving system including channel-switching in accordance with an embodiment of the present invention.

As shown in FIG. 2, a digital broadcast receiving system 200 includes a tuner 210, a demodulator 220, a Conditional Access System (CAS) 230, a demultiplexer 240, an MPEG demodulator 250, an image display processor 260, a controller 270, a memory 280 and an input/output unit 290.

The tuner 210 of the digital broadcast receiving system tunes to an analog broadcast signal received from the digital broadcast transmission system 100 in order to separate a desired physical channel. The demodulator 220 demodulates the analog signal inputted from the tuner 210 into a digital signal. The demodulator 220 also outputs conditional access information, such as key information and watching authority information for contents, to the CAS 230. Herein conditional access information used in accordance with an embodiment of the present invention is generated to enable conditional access control on a physical channel basis. Such conditional access information includes CAT, ECM, EMM and CW constituted in the physical channel basis.

The CAS 230 carries out descrambling or controls conditional access to received contents. For example, the CAS 230 describes conditional access control according to watching authority information. When a user selects contents, the CAS 230 confirms whether or not the user has watching authority on the contents according to watching authority information for contents, and if the user has the authority, decodes encoded contents data according to key information. Watching authority information can be set according to the service level, age and so on of the user. The CAS 230 can also carry out copy protection.

The demultiplexer 240 receives conditional access-processed physical channels from the CAS 230, and demultiplexes the physical channels to separate logical channels from the physical channels. The MPEG demodulator 250 decompresses MPEG data in the logical channels outputted from the demultiplexer 240 according to MPEG techniques. The image display processor 250 carries out image processing on an image signal inputted from the MPEG demodulator 250 to output an image via a display unit (e.g., a TV, monitor and the like).

The controller 270 interfaces with the above-mentioned components, and carries out channel-switching in response to a user request. The controller 270, upon receiving a channel-switching request inputted from a user, controls the above components to receive and output a logical channel corresponding to the request.

The controller 270 can request the broadcast transmission system 100 to transmit a physical channel including a corresponding logical channel preference channel or an interested channel of the user. For this purpose, the controller can select a preference channel of the user by referring to the past channel selection history of the user or receive interested channel information from the user, and then transmit corresponding channel information to the broadcast transmission system 100.

The memory 280 stores conditional access information received from the broadcast transmission system 100 and preference or interested channel information inputted by the controller 270. The input/output unit 290 carries out input/output to/from the user.

Furthermore, it is possible to use various means for inputting a user request to the broadcast receiving system 200. Examples thereof include function keys provided on the broadcast receiving system 200 or a remote control for operating the broadcast receiving system 200. Furthermore, a television, monitor and so on can be used as a display means for providing a selected channel to the user.

In the foregoing description, the conditional access control of the broadcast transmission system 100 in the digital broadcasting system is a scrambling process that enables only permitted users to receive corresponding contents, and the conditional access control of the broadcast receiving system 200 in the digital broadcasting system is a descrambling process that enables users to use the scrambled contents. However, the two processes are commonly referred to as "conditional access control" without specific discrimination in case the two processes are confused.

Figure 3:
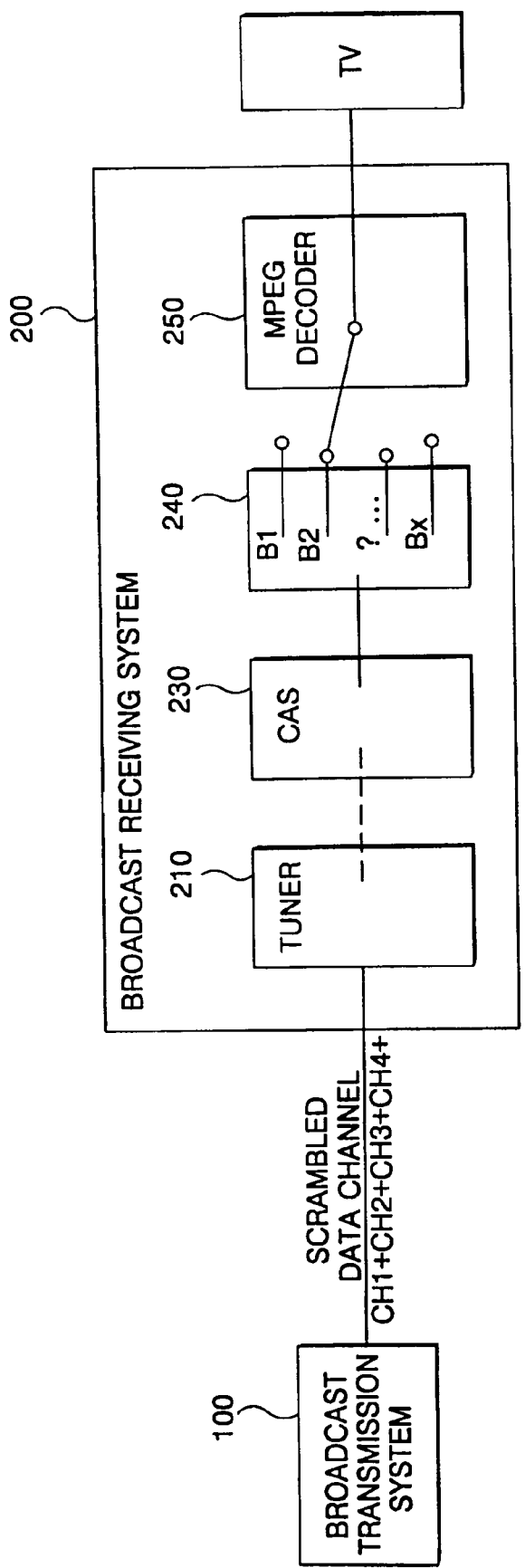
FIG. 3 is a block diagram of the transmission of a physical channel between a digital broadcast transmission system and a digital broadcast receiving system, in which the physical channel is conditionally access controlled on physical channel basis.

FIG. 3 is a block diagram of the transmission of a physical channel between a digital broadcast transmission system and a digital broadcast receiving system, in which the physical channel is conditionally access controlled.

FIG. 3 merely illustrates the tuner 210, the CAS 230, the demultiplexer 240 and the decoder 250 of the broadcast receiving system 200, without showing other components. FIG. 3 also illustrates a TV as display means for providing a digital broadcast to a user.

The broadcast transmission system 100 of FIG. 3 provides physical channels that can be conditionally access-controlled on a physical channel basis. These physical channels include logical channels existing in series in the form of "CH1+CH2+ CH3+CH4+ . . . " Herein CH1, CH2 and the like means logical channels included in their physical channels. Of course this is only an example for facilitating the understanding of the present invention. The present invention is not limited thereto. As shown in FIG. 3, the logical channel outputted by the demultiplexer 240 is a logical channel that is already scrambled. Therefore, when switching between logical channels present in one physical channel, channel-switching in the broadcast receiving system 200 can be carried out without additional conditional access control, by selecting a logical channel corresponding to the channel-switching request of the user from logical channels outputted by the demultiplexer 240.

Figure 4:
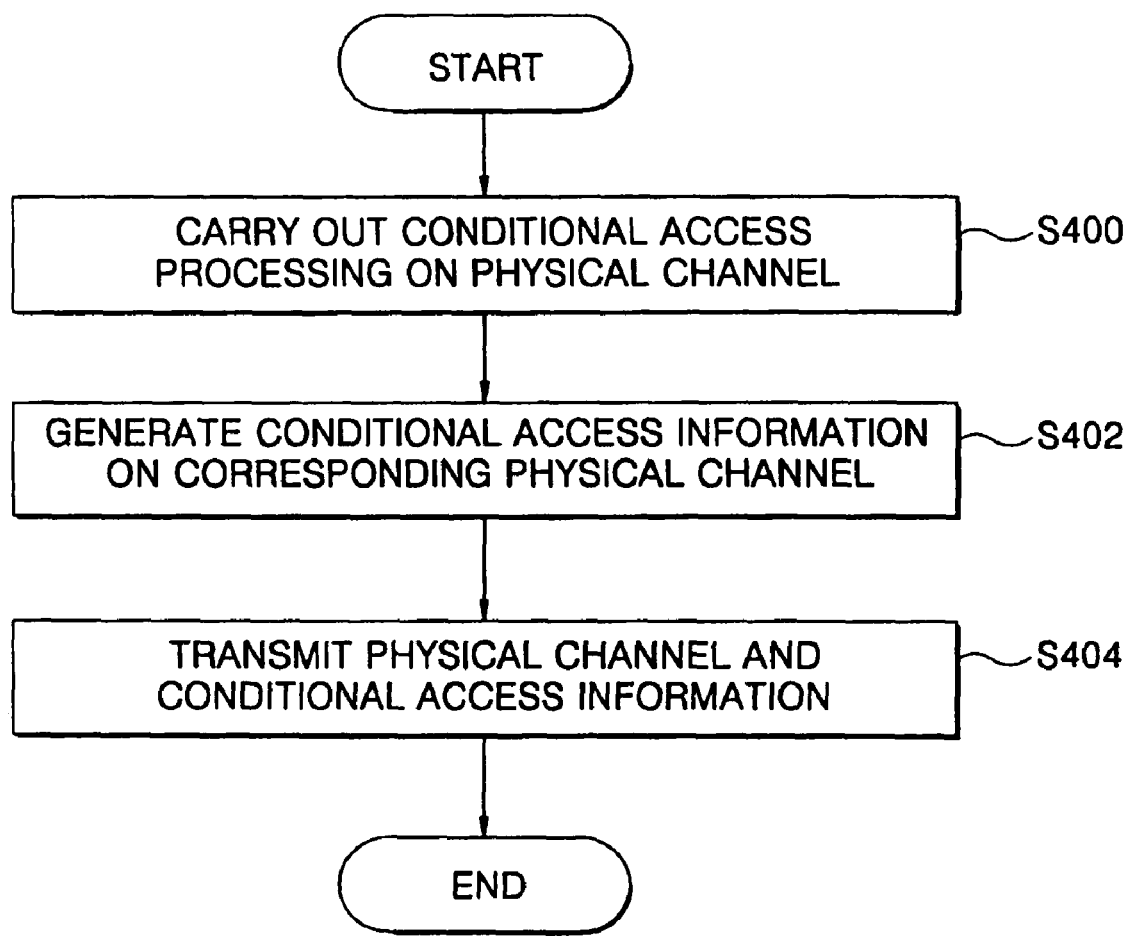
FIG. 4 is a flowchart of a channel-switching process in the digital broadcast transmission system in accordance with an embodiment of the present invention.

FIG. 4 is a flowchart of a channel-switching process in the digital broadcast transmission system in accordance with an embodiment of the present invention.

In S400 of FIG. 4, the channel-switching apparatus carries out conditional access control on a physical channel basis. In S402, the channel-switching apparatus respectively generates conditional access information for the physical channels, corresponding to the conditional access control of S400. In S404, the channel-switching apparatus transmits information on the conditional access-controlled physical channels and conditional access information corresponding to the respective physical channels.

The channel switching apparatus provides physical channels including logical channels according to a single broadcast policy or physical channels including logical channels selected in response to a request from the broadcast receiving system.

Figure 5:
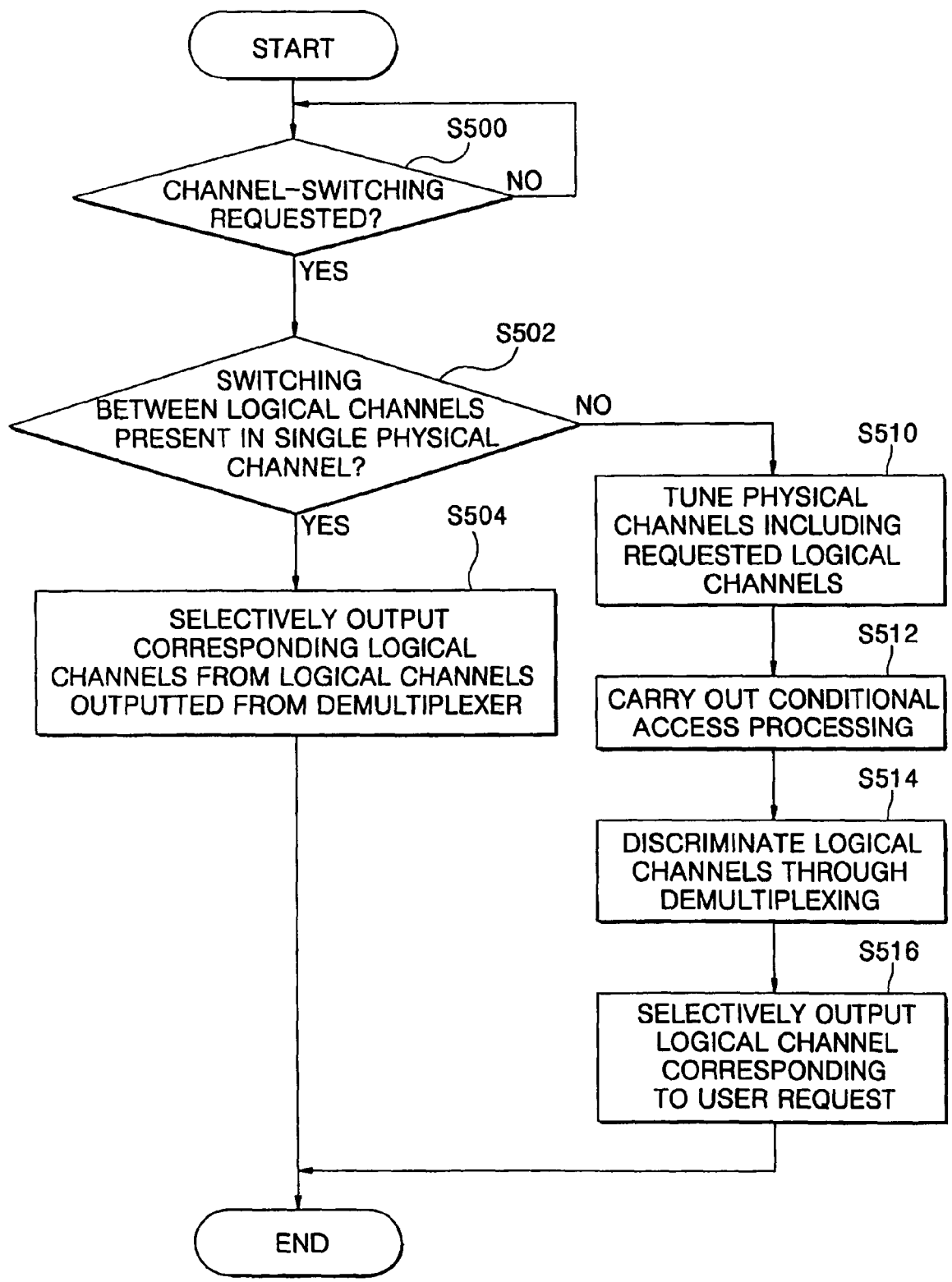
FIG. 5 is a flowchart of a channel-switching process in the digital broadcast receiving system in accordance with an embodiment of the present invention.

FIG. 5 is a flowchart of a channel-switching process in the digital broadcast receiving system in accordance with an embodiment of the present invention.

In S500 of FIG. 5, the channel-switching apparatus receives a channel-switching request from a user. In S502, the channel-switching apparatus determines whether or not there is a request to switch logical channels in a single physical channel.

If there is a request to switch logical channels in a single physical channel, the channel-switching apparatus selectively outputs corresponding logical channels out of logical channels outputted by the demultiplexer 240 in S504.

If there is a request to switch different physical channels in S502, the channel-switching apparatus carries out tuning on physical channels present where corresponding logical channels are present in S510. In S512, the channel-switching apparatus carries out conditional access control of the tuned physical channels based upon conditional access information received from the broadcast transmission apparatus 100. In S514, the channel-switching apparatus carries out demultiplexing of the physical channels after conditional access control to discriminate logical channels in the physical channels. In S516, the channel-switching apparatus selectively outputs logical channels corresponding to user request out of the demuliplexed logical channels.

As described above, the present invention enables logical channels present in a single physical channel to be switched without additional conditional access control, thereby reducing channel-switching time. Through the broadband convergence of physical channels and by providing physical channels each including preference or interested channels of a user, it is possible to increase the logical channel-switching rate in one physical channel, thereby maximizing the effect of the present invention.

As described hereinbefore, with conditional access control on a physical channel basis, the present invention can carry out channel-switching between logical channels without additional conditional access control, thereby reducing channel-switching time. Furthermore, the present invention can maximize its effect by including logical channels in one physical channel.

While the present invention has been shown and described in connection with exemplary embodiments, it will be apparent to those skilled in the art that modifications and variations can be effected without departing from the spirit and scope of the present invention as defined by the appended claims.

What is claimed is:

1. A channel-switching apparatus of a broadcast receiving system in a digital broadcasting system, comprising:
   a tuner to tune physical channels to discriminate each of the physical channels; a conditional access unit to execute conditional access control on the tuned physical channels by using conditional access information carried by the tuned physical channels, with the conditional access information enabling the conditional access control to be executed on a physical channel basis;

a demultiplexer to demultiplex the physical channels which are processed by the conditional access control to discriminate logical channels in the physical channels; and a controller to control the tuner, the conditional access unit, the demultiplexer, and a demodulator, to receive a logical channel in response to a channel-switching request, and to output the received logical channel in a single physical channel, wherein the conditional access unit is configured to receive the conditional access information in physical channel units corresponding to the tuned physical channels, and to execute conditional access control of the tuned physical channels based upon the received conditional access information, wherein, in response to the channel-switching request, the controller determines if the channel-switching request is a request to switch logical channels in the single physical channel, and wherein if the channel-switching request is a request to switch logical channels in the single physical channel, the controller controls the tuner to tune to a logical channel corresponding to the channel-switching request without carrying out conditional access processing.

2. The channel-switching apparatus according to claim 1, wherein the conditional access information comprises at least one piece of information selected from a group consisting of a Conditional Access Table (CAT), an Entitlement Control Message (ECM), an Entitlement Management Message (EMM), and a Control Word (CW) on physical channels.

3. The channel-switching apparatus according to claim 1, wherein the controller is configured to select logical channels preferred by a user based upon past channel-switching history of the user, and to request a broadcast transmission system to provide physical channels comprising the selected preference logical channels.

4. The channel-switching apparatus according to claim 1, wherein the controller is configured to receive user-preferred logical channels and to request a broadcast transmission system to provide physical channels comprising the user-preferred logical channels.

5. A channel-switching system in a digital broadcasting system, comprising:

a broadcast transmission system to generate conditional access information on respective physical channels and to transmit the conditional access information via the respective physical channels, with the conditional access information enabling conditional access control to be executed on a physical channel basis by a broadcast receiving system; and the broadcast receiving system to, upon reception of a channel-switching request, determine if the channel-switching request is a request to switch logical channels in a single physical channel, receive the single physical channel comprising a logical channel corresponding to the channel-switching request to execute the conditional access control by using the conditional access information carried by the single physical channel comprising the logical channel corresponding to the channel-switching request, to receive the single physical channel which is processed by the conditional access control in response to the channel-switching request to execute conditional access control of physical channels, to demultiplex the physical channels which are processed by the conditional access control to discriminate logical channels in the physical channels, and to output the logical channel corresponding to the channel-switching request from the single physical channel which is processed by the conditional access control, wherein the broadcast receiving system is configured to receive the conditional access information in physical channel units corresponding to the physical channels, and to execute conditional access control of the physical channels based upon the received conditional access information from the broadcast transmission system, and wherein if the channel-switching request is a request to switch logical channels in the single physical channel, the broadcast receiving system tunes to a logical channel corresponding to the channel-switching request without carrying out conditional access processing.

6. The channel-switching system according to claim 5, wherein the broadcast transmission system is configured to transmit logical channels complying with an equal conditional access policy as carried by one physical channel.

7. The channel-switching system according to claim 5, wherein the conditional access information comprises at least one piece of information selected from a group consisting of a Conditional Access Table (CAT), an Entitlement Control Message (ECM), an Entitlement Management Message (EMM), and a Control Word (CW) on physical channels.

8. The channel-switching system according to claim 5, wherein the controller is configured to select logical channels preferred by a user based upon past channel switching history of the user, and to request the broadcast transmission system to provide physical channels comprising the selected preference logical channels.

9. The channel-switching system according to claim 5, wherein the controller is configured to receive user-preferred logical channels and to request the broadcast transmission system to provide physical channels comprising the user-preferred logical channels.

10. A channel-switching method of a broadcast receiving system in a digital broadcasting system, the method comprising:
receiving a channel-switching request;
determining if the channel switching request is a request to switch logical channels in a single physical channel;
tuning the single physical channel comprising a logical channel corresponding to the channel-switching request, with the single physical channel comprising logical channels complying with an equal broadcast policy;
demultiplexing the single physical channel processed according to a conditional access control to discriminate the logical channels in the single physical channel;
executing the conditional access control of the single physical channel with reference to conditional access information corresponding to the demultiplexed single physical channel, with the conditional access information enabling the conditional access control to be performed on a physical channel basis;
outputting the logical channel corresponding to the channel-switching request from the single physical channel which is processed by the conditional access control, and
wherein if the channel-switching request is a request to switch logical channels in the single physical channel, tuning to a logical channel corresponding to the channel-switching request without carrying out conditional access processing.

11. The channel-switching method according to 10, wherein the conditional access information enables the conditional access control to be executed for the corresponding single physical channel which carries corresponding conditional access information.

12. The channel-switching method according to claim 10, wherein the conditional access information comprises at least one piece of information selected from a group consisting of a Conditional Access Table (CAT), an Entitlement Control Message (ECM), an Entitlement Management Message (EMM), and a Control Word (CW) on physical channels.

* * * * *